US011057193B2

(12) United States Patent
Kuang et al.

(10) Patent No.: US 11,057,193 B2
(45) Date of Patent: Jul. 6, 2021

(54) ENHANCED RANDOMNESS FOR DIGITAL SYSTEMS

(71) Applicant: Quantropi Inc., Ottawa (CA)

(72) Inventors: Yurang Kuang, Ottawa (CA); Nicolas Bettenburg, Ottawa (CA)

(73) Assignee: Quantropi Inc., Ottawa (CA)

( * ) Notice: Subject to any disclaimer, the term of this patent is extended or adjusted under 35 U.S.C. 154(b) by 0 days.

(21) Appl. No.: 17/066,273

(22) Filed: Oct. 8, 2020

(65) Prior Publication Data

US 2021/0036840 A1 Feb. 4, 2021

Related U.S. Application Data

(63) Continuation of application No. PCT/CA2020/050417, filed on Mar. 31, 2020.

(60) Provisional application No. 62/913,890, filed on Oct. 11, 2019, provisional application No. 62/837,370, filed on Apr. 23, 2019.

(51) Int. Cl.
*H04L 9/06* (2006.01)
*H04L 9/08* (2006.01)

(52) U.S. Cl.
CPC .......... *H04L 9/0662* (2013.01); *H04L 9/0618* (2013.01); *H04L 9/085* (2013.01); *H04L 9/0869* (2013.01)

(58) Field of Classification Search
USPC .......... 380/46, 255, 264, 276; 726/2, 21, 36; 713/150, 163, 181
See application file for complete search history.

(56) References Cited

U.S. PATENT DOCUMENTS

| 5,862,260 | A | * | 1/1999 | Rhoads | G07F 7/12 382/232 |
| 6,813,366 | B1 | * | 11/2004 | Rhoads | B42D 25/00 382/100 |
| 7,334,125 | B1 | * | 2/2008 | Pellacuru | H04L 9/083 380/277 |
| 10,158,485 | B2 | | 12/2018 | Satpathy et al. | |
| 10,476,664 | B2 | * | 11/2019 | Kuang | H04L 9/065 |
| 2001/0016051 | A1 | * | 8/2001 | Rhoads | H04N 1/32251 382/100 |

(Continued)

FOREIGN PATENT DOCUMENTS

WO    WO 2019/079890 A1    5/2019

OTHER PUBLICATIONS

International Search Report and Written Opinion in connection with International Application No. PCT/CA2020/050417, dated Jun. 23, 2020.

(Continued)

*Primary Examiner* — Sharif E Ullah
(74) *Attorney, Agent, or Firm* — Wolf, Greenfield & Sacks, P.C.

(57) ABSTRACT

A digital processing method, which comprises obtaining a stream of N-bit input data words; obtaining a value k between 0 and M−1, inclusively, where M>1; processing each of the N-bit input data words at least based on the kth of M permutation elements to produce a corresponding N-bit output data word; and outputting a stream of N-bit output data words on a network or storing the stream of the N-bit output data words in a non-transitory storage medium.

31 Claims, 15 Drawing Sheets

(56) References Cited

U.S. PATENT DOCUMENTS

| | | | | |
|---|---|---|---|---|
| 2001/0019618 A1* | 9/2001 | Rhoads | ............... | G06T 1/0028 |
| | | | | 382/100 |
| 2003/0046539 A1* | 3/2003 | Negawa | ............... | H04L 9/0822 |
| | | | | 713/163 |
| 2003/0102660 A1* | 6/2003 | Rhoads | .................. | G07D 7/20 |
| | | | | 283/72 |
| 2003/0182246 A1* | 9/2003 | Johnson | ............ | G06Q 20/3821 |
| | | | | 705/76 |
| 2005/0196013 A1* | 9/2005 | Rhoads | ............. | H04N 1/32144 |
| | | | | 382/100 |
| 2007/0274525 A1* | 11/2007 | Takata | ................. | H04L 63/065 |
| | | | | 380/270 |
| 2015/0128234 A1* | 5/2015 | Xavier | ............... | H04L 63/0869 |
| | | | | 726/6 |
| 2015/0172292 A1* | 6/2015 | Kuang | ................ | H04L 9/3226 |
| | | | | 713/155 |
| 2017/0019396 A1* | 1/2017 | Bettenburg | .......... | H04L 63/083 |

OTHER PUBLICATIONS

Jacob et al., Towards the Generation of a Dynamic Key-Dependent S-Box to Enhance Security. Feb. 7, 2015. 5 pages.

Kak, Lecture 8: AES: The Advanced Encryption Standard. Lecture Notes on "Computer and Network Security". Purdue University. Feb. 5, 2020. 91 pages.

* cited by examiner

ENHANCED RANDOMNESS FOR DIGITAL SYSTEMS

CROSS-REFERENCE TO RELATED APPLICATIONS

The present application is a continuation of International Application No. PCT/CA2020/050417, filed on Mar. 31, 2020, which claims the benefit of U.S. provisional application Ser. No. 62/837,370, filed on Apr. 23, 2019. International Application No. PCT/CA2020/050417 also claims the benefit of U.S. provisional application Ser. No. 62/913,890, filed on Oct. 11, 2019. The aforementioned applications are hereby incorporated by reference herein.

FIELD

The present disclosure relates to encryption and decryption of data in digital communications.

BACKGROUND

There has always been a need for security in digital systems. In a digital communication system utilizing a data network, plaintext is converted into ciphertext using an encryption scheme and the ciphertext is sent over the data network. A recipient receives the ciphertext and converts it back into the original plaintext using a decryption scheme that bears some relation to the encryption scheme.

Many modern encryption schemes rely on what is commonly referred to as a "shared secret", namely an element of information that is known by the party with which communication is desired, and unknown to others. The shared secret is used to generate keys which are used in turn for encrypting the plaintext into ciphertext or for decrypting the ciphertext into the plaintext.

A common goal is to make the encryption scheme "strong". The strength of the encryption scheme (or, to put it differently, the difficulty with which the encryption scheme can be "cracked") is predicated on the difficulty with which an external observer can discover the keys or the secret from which they are produced. In this regard, the randomness of the ciphertext is a factor, in that the greater the randomness of the ciphertext resulting from arbitrary input plaintext, the harder it is for an observer to infer the plaintext from the ciphertext, and hence the encryption scheme is considered to be stronger.

It is therefore desirable to provide encryption schemes that produce ciphertext from plaintext with a high degree of randomness.

BRIEF SUMMARY

In accordance with various aspects, this disclosure relates to a digital processing method comprising obtaining a stream of N-bit input data words, obtaining a value k between 0 and M−1, inclusively, where M>1, processing each of the N-bit input data words at least based on the kth of M permutation elements to produce a corresponding N-bit output data word and outputting a stream of N-bit output data words on a network or storing the stream of the N-bit output data words in a non-transitory storage medium.

According to another aspect, this disclosure relates to a system comprising a user I/O, a memory, a network I/O and a processor configured to obtain a stream of N-bit input data words, to obtain a value k between 0 and M−1, inclusively, where M>1, to process each of the N-bit input data words at least based on the kth of M permutation elements to produce a corresponding N-bit output data word and to output a stream of N-bit output data words on a network or to store the stream of the N-bit output data words in a non-transitory storage medium.

According to another aspect, this disclosure relates to a computer-readable medium comprising computer-readable instructions which, when executed by a processor, cause the processor to carry out a digital processing method. The digital processing method comprises obtaining a stream of N-bit input data words, obtaining a value k between 0 and M−1, inclusively, where M>1, processing each of the N-bit input data words at least based on the kth of M permutation elements to produce a corresponding N-bit output data word and outputting a stream of N-bit output data words on a network or storing the stream of the N-bit output data words in a non-transitory storage medium.

According to another aspect, the present disclosure seeks to provide an entropy expander comprising a switching core comprising M permutation elements; a dispatcher configured to receive a value k between 0 and M−1, inclusively, where M>1, the dispatcher being further configured to route N-bit input data words towards the $k^{th}$ of the M permutation elements, the switching core being configured to carry out processing of each of the N-bit input data words at least based on the $k^{th}$ of the M permutation elements to produce a corresponding N-bit output data word; a collector configured to receive the value k between 0 and M−1, inclusively, where M>1, the collector being further configured to draw the N-bit output data words from the $k^{th}$ of the M permutation elements and to output the N-bit output data words on a network or to store the N-bit output data words in a non-transitory storage medium.

Another aspect of the present disclosure seeks to provide a digital communications system, comprising: a sender device and a recipient device connectable to a network. The sender device is configured for: obtaining N-bit first data words; obtaining a value k between 0 and M−1, inclusively, where M>1; processing each of the N-bit first data words at least based on the $k^{th}$ of M first permutation elements to produce corresponding N-bit second data words; and releasing the N-bit second data words on a network towards a recipient device. The recipient device is configured for: receiving the N-bit second data words; obtaining a value j between 0 and M−1, inclusively, where M>1; processing each of the N-bit second data words at least based on the $i^{th}$ of M second permutation elements to produce corresponding N-bit third data words, the values of j and k being synchronized so that k and j are the same when a particular N-bit second data word is processed by the kth permutation element of the sender device and the jth permutation element of the recipient device, the kth and jth permutation elements being characterized by permutation matrices that are transposes of one another; and outputting the N-bit third data words on a network or storing the N-bit third data words in a memory.

A further aspect of the present disclosure seeks to provide a digital processing method comprising: obtaining a stream of N-bit AES (Advanced Encryption Standard) round keys; obtaining a value k between 0 and M−1, inclusively, where M>1; processing each of the N-bit input AES round keys at least based on the $k^{th}$ of M permutation elements to produce corresponding N-bit output AES round keys; and using the N-bit output AES round keys to carry out AES encryption of an input message.

BRIEF DESCRIPTION OF DRAWINGS

A detailed description of embodiments is provided below, by way of example only, with reference to drawings accompanying this description, in which.

It is to be expressly understood that the description and drawings are only for purposes of illustrating certain embodiments and are an aid for understanding. They are not intended to be and should not be limiting.

DETAILED DESCRIPTION

Figure 1:
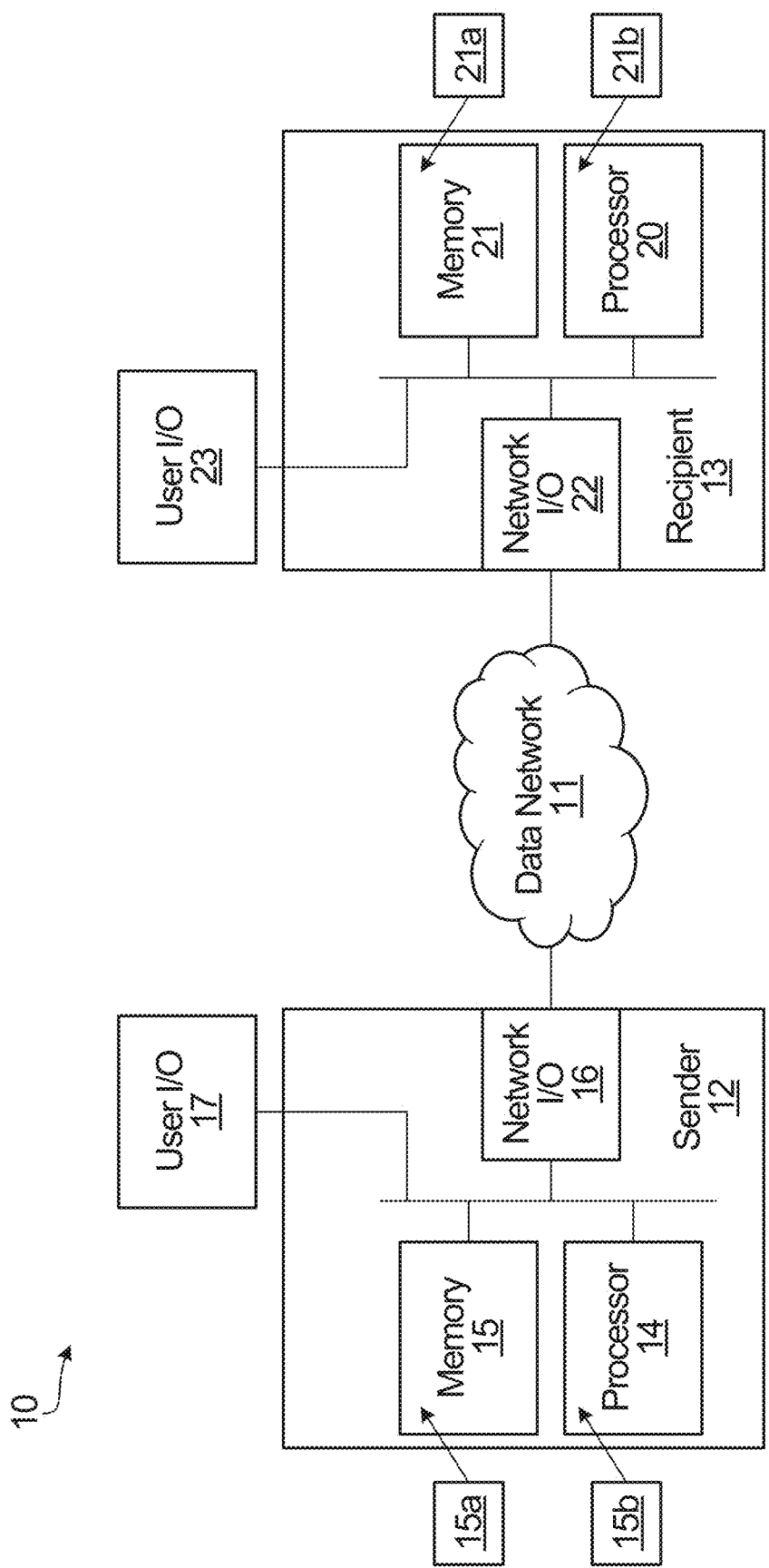
FIG. 1 is a block diagram conceptually illustrating two communication devices communicating over a data network.

FIG. 1 shows two communication devices 10 communicating over a data network 11. The communication devices 10 are referred to as a "sender device" 12 and a "recipient device" 13, however these terms are not intended to be limiting. That is to say, communication may be bidirectional such that the recipient device 13 may send data to the sender device 12 and the sender device 12 may receive data from the recipient device 13. Depending on the implementation, the data network 11 may be the internet, a local area network, a wireless network, a combination of such networks or still other forms of data networks.

The sender device 12 includes a processor 14 (e.g., a microprocessor, CPU, graphics processing unit), a memory 15 (e.g., volatile memory, non-volatile memory), a network I/O 16 for connection to the data network 11 (e.g., PHY transmitter, network card, antenna), possibly a user I/O 17 (e.g., touch screen, keyboard, loudspeaker). The memory 15 stores data 15A and computer-readable instructions 15B, and the processor 14 is configured to read and execute such instructions and read/write such data 18. By reading and executing the computer-readable instructions 15B, the processor 14 carries out certain processes that control behavior and operation of the sender device 12.

The recipient device 13 also includes a processor 20 (e.g., a microprocessor, CPU, graphics processing unit), a memory 21 (e.g., volatile memory, non-volatile memory), a network I/O 22 for connection to the data network 11 (e.g., PHY transmitter, network card, antenna), possibly a user I/O 23 (e.g., touch screen, keyboard, loudspeaker). The memory 21 stores data 21A and computer-readable instructions 21B, and the processor 20 is configured to read and execute such instructions and read/write such data 24. By reading and executing the computer-readable instructions 21B, the processor 20 carries out certain processes that control behavior and operation of the recipient device 13.

Figure 2:
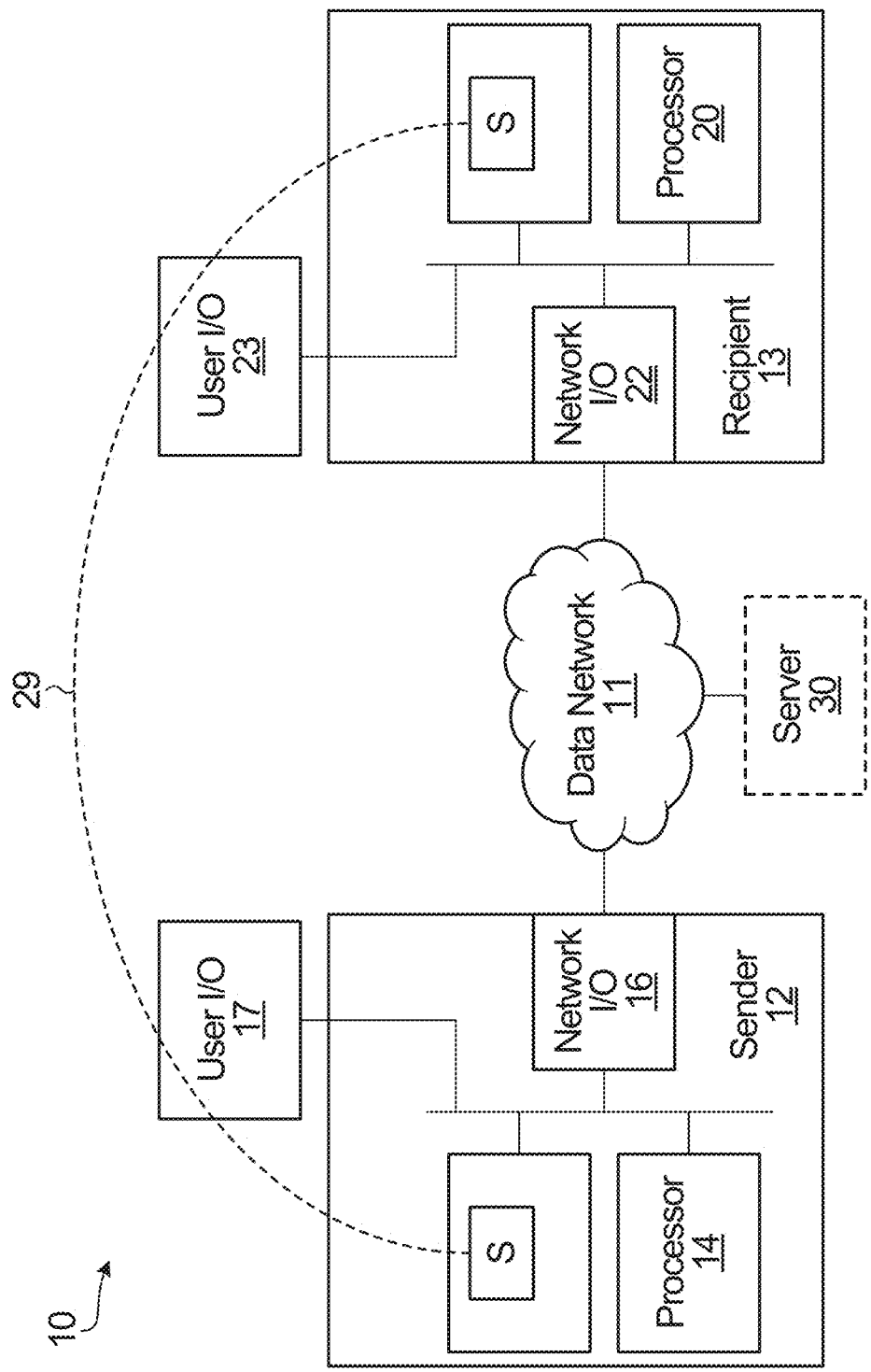
FIG. 2 is a block diagram conceptually illustrating a sender device and a recipient device, each configured to store a secret S in their respective memories.

With reference now to FIG. 2, the sender device 12 and the recipient device 13 are each configured to store a secret S in their respective memories 15, 21. The secret S may be a data element 27 encoded using a plurality of bits 28 or other digital symbols (e.g., hexadecimal characters). The same secret S is known to both the sender device 12 and the recipient device 13. In some embodiments, the secret S may be originated by the sender device 12 and shared with the recipient device 13. In other embodiments, the secret S may be originated by the recipient device 13 and shared with the sender device 12. In some embodiments, the secret S can be sent from the sender device 12 to the recipient device 13 (or vice versa) over the data network 11. In other embodiments, a secure, out-of-band communication channel 29 may be used by the sender device 12 and the recipient device 13 to share the secret S. In still other embodiments, the secret S may be obtained from a third party by both the sender device 12 and the recipient device 13. The third party may be a server 30 (e.g., a web server) accessible via the data network 11.

One example of a process encoded by the computer-readable instructions 15B of the sender device 12 and carried out by the processor 14 of the sender device 12 is an entropy expansion process. It is so termed because entropy is expanded from N bits (for an N-bit system) to $\log_2(2^N!)$ bits by introducing a permutation transformation, and is further expanded to $M*\log_2(2^N!)$ bits by the availability of M such transformations.

Figure 3:
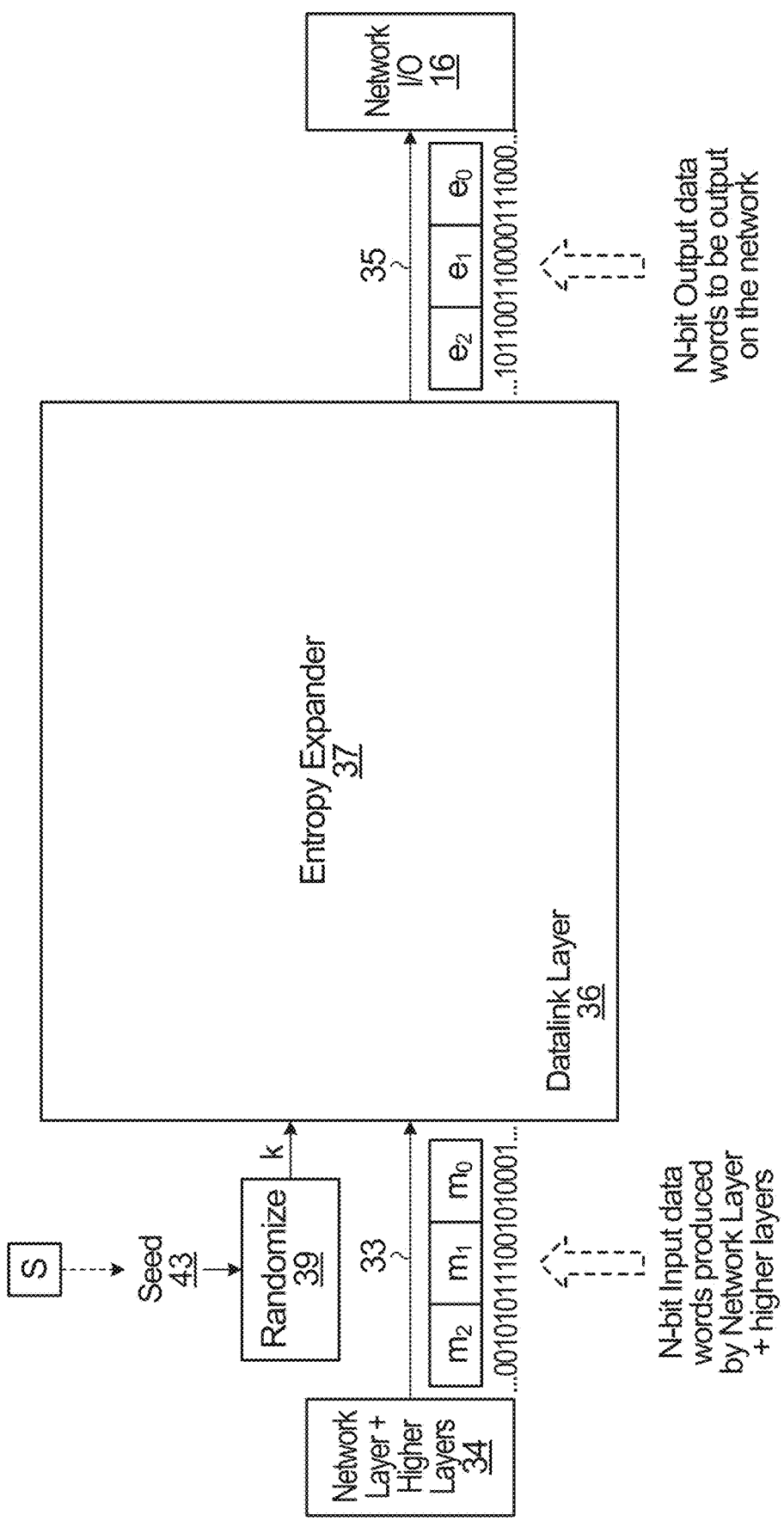
FIG. 3 is a block diagram conceptually illustrating operation of an entropy expansion process, in accordance with a non-limiting embodiment.

FIG. 3 is a block diagram conceptually illustrating operation of the entropy expansion process. Specifically, it is assumed that the sender device 12 is configured to produce N-bit input data words 33 for transmission of N-bit output data words 35 to the recipient device 13 over the data network 11. These input data words 33 may contain text, speech, video or any other data that the sender device 12 may wish to send to the recipient device 13. Prior to being processed by the entropy expansion process, the input data words 33 may already have been subjected to encoding and/or encryption at the network layer 34 or at a higher layer. The entropy expansion process produces N-bit output data words 35 from the N-bit input data words 33. The N-bit output data words 35 are then sent onto the data network 11 via the network I/O 16. In other words, in this embodiment, the entropy expansion process intervenes at the data link layer 36 and encrypts the N-bit output data words prior to being sent to the recipient device 13 via the data network 11. In other embodiments, the entropy expansion process may intervene at a different layer of the OSI model, and may result in the N-bit output data words 35 being stored in memory 15 or processed by other network systems.

The entropy expansion process may be conceptually described in the form of an entropy expander 37 acting on a stream of N-bit input data words m0, m1, . . . , to produce a stream of N-bit output data words e0, e1, . . . . In an embodiment, N can take on any integer value greater than 1. Possible values for N include even numbers and powers of 2, but N could also be an odd number; namely, there is no particular limitation on the value of N. The stream of N-bit output data words e0, e1, . . . , may be output onto the data network 11, converted by a higher layer application 38 or stored in a memory 15 or other non-transitory computer-readable medium.

Figure 4:
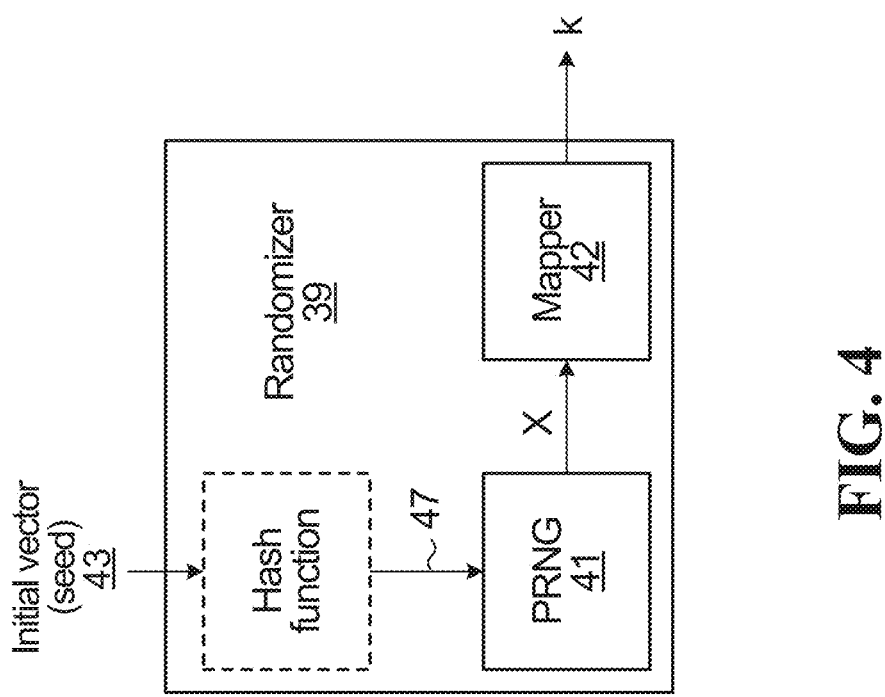
FIG. 4 is a block diagram conceptually illustrating a possible implementation of a randomizer, in accordance with a non-limiting embodiment.

The entropy expander 37 may also be coupled to a randomizer 39 configured to produce a randomized value k between 0 and M−1 (where M>1, e.g., 64, 256, 512, 1024, etc.; however, M need not be a power of 2). With reference to FIG. 4, there is shown a possible implementation of the randomizer 39, whereby there is provided a pseudo-random number generator (hereinafter PRNG) 41 and a mapper 42. The PRNG 41 is initialized with a seed 43 and feeds a pseudo-random number X to the mapper 42. The mapper 42 converts X to a value k between 0 and M−1. The mapper 42 may carry out a modulo M function or any other hash function that produces k between 0 and M−1. In other embodiments, the output of the PRNG 41 may be constrained to be between 0 and M−1, in which case the mapper 42 may not be needed.

The PRNG 41 may be any suitable PRNG 41 initialized with any initial vector (seed) 43. In some embodiments, which are not to be considered limiting, the seed 43 of the PRNG 41 may be the secret S or it may be a hash 47 of the secret S. As such, the secret S may be a direct input or an indirect input to the PRNG 41. Other implementations of the randomizer 39 to produce a value k between 0 and M−1, are possible; some of these embodiments accept the secret S as the seed 43 either directly or indirectly, whereas others do not.

In still other embodiments, k is deterministically obtained from the position of the N-bit input data words m0, m1, . . . , that is to say, for input data word m0, k=0; for input data word m1, k=1, and so on. In such embodiments, no randomizer is required.

The value k is used to select one of several available permutation elements to be used in generating the N-bit output data word 35. Such permutation elements will be implemented differently, depending on whether the implementation of the entropy expander 37 is primarily hardware-based (FIGS. 5A and 5B) or software-based (FIG. 7), as will be described in some detail herein below.

Figure 5A:
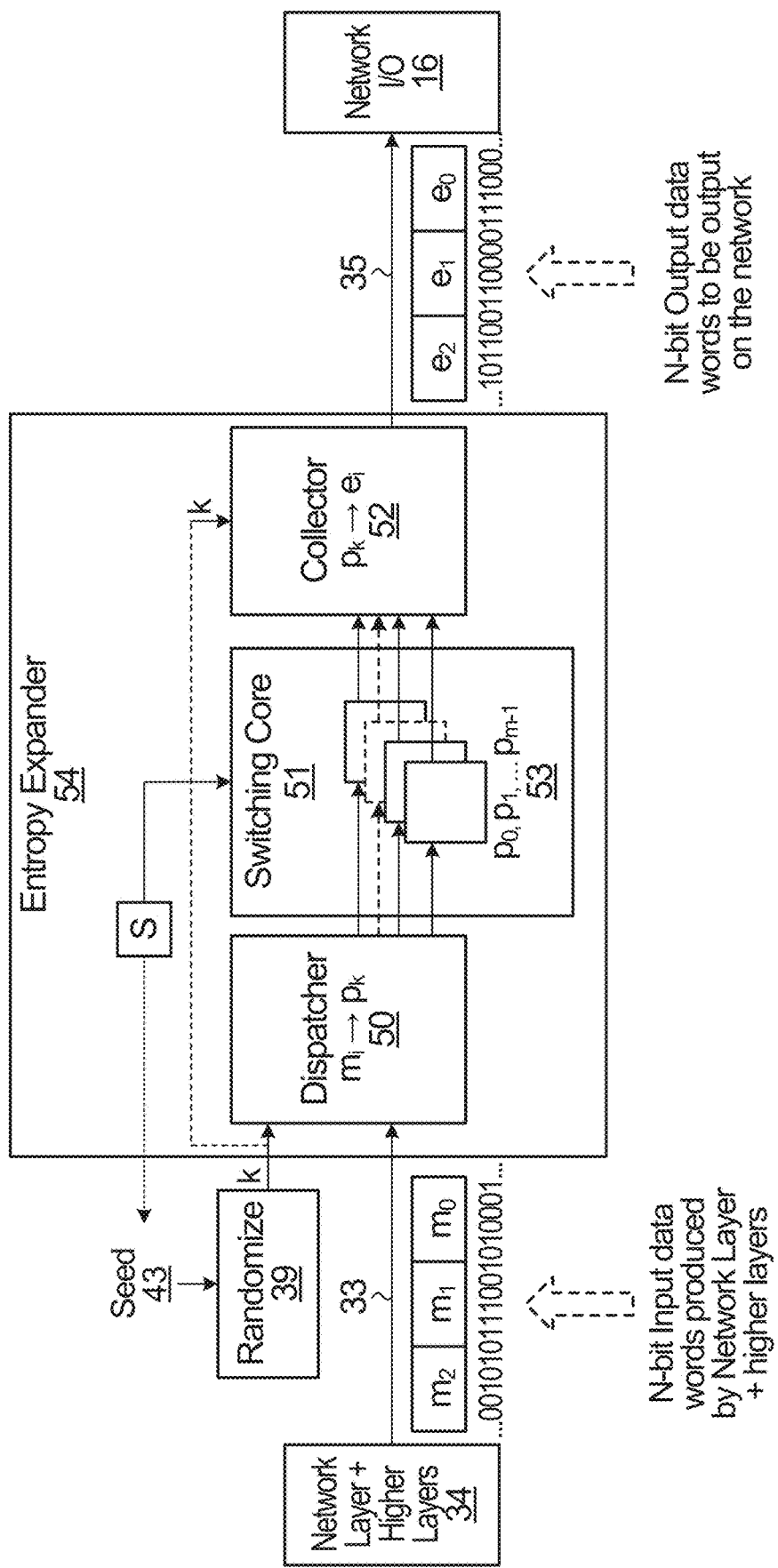
FIG. 5A is a block diagram conceptually illustrating an example of a hardware-based implementation of an entropy expander, in accordance with a non-limiting embodiment.

An example of a hardware-based implementation of the entropy expander 37 is described first, with reference to FIG. 5A. In this case, the entropy expander 37 may comprise: a dispatcher 50, a switching core 51 and a collector 52. The switching core 51 comprises M switching elements 53 denoted $p_0, \ldots p_{M-1}$. The switching elements 53 comprise the "permutation elements" in the hardware-based implementation. The kth one of the M switching elements 53 is the one towards which the N-bit input data word 33 is directed by the dispatcher 50 and from which the collector 52 draws the N-bit output data word 35. To this end, the dispatcher 50 can be implemented as a demultiplexer and the collector 52 can be implemented as a multiplexer, each with a select line 541, 542 that receives the value k from the randomizer 39.

Each switching element 53 has the ability to convert a received N-bit input data word 33 into a $2^N$-element sparse input bit array. The term "sparse" in this case refers to an array having a 1 in one position and a 0 in all others. Each switching element 53 is also configured to convert the $2^N$-element sparse input bit array into a $2^N$-element sparse output bit array. Finally, each switching element 53 is configured to convert the $2^N$-element sparse output bit array into an N-bit output data word 35.

Figure 5B:
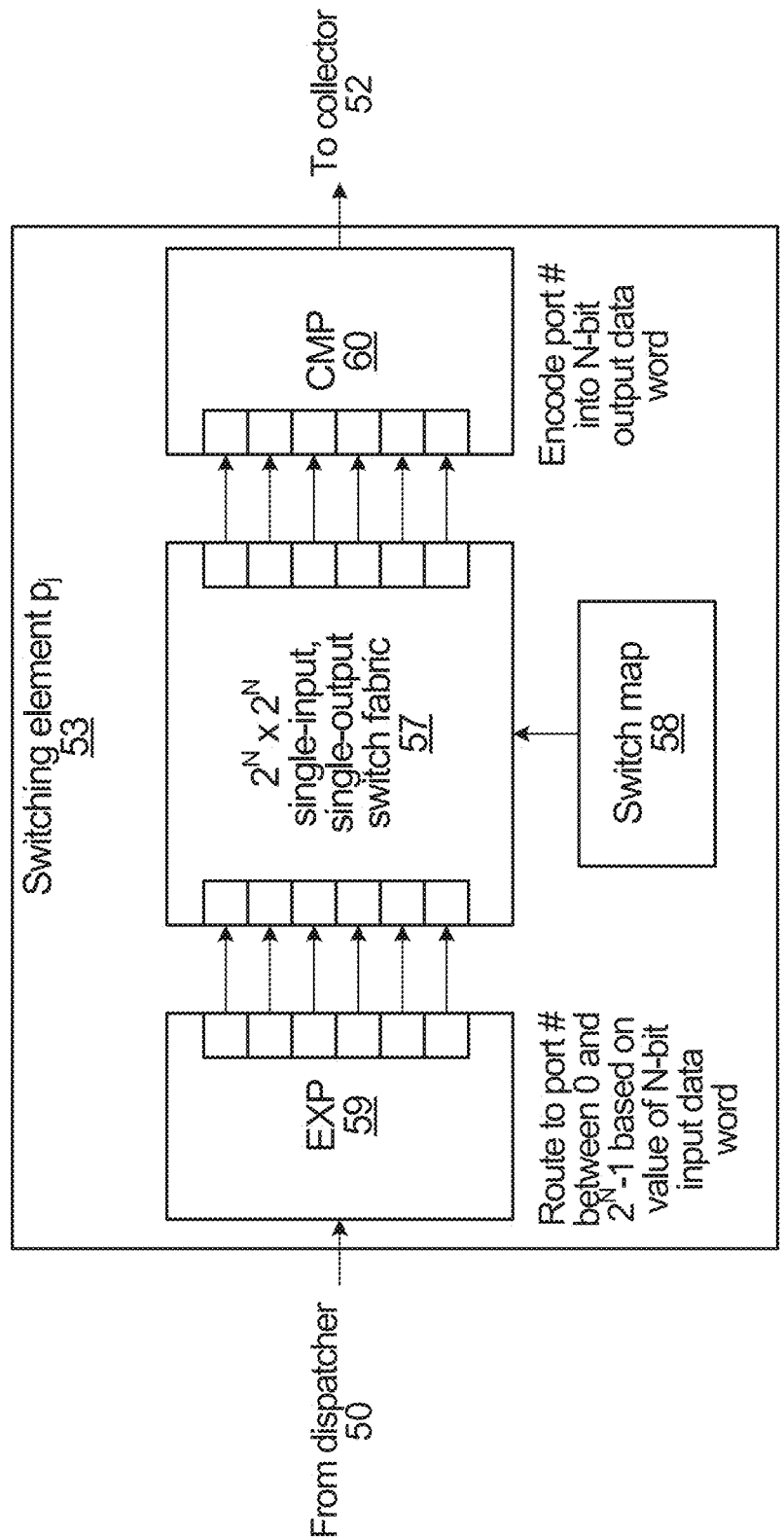
FIG. 5B is a block diagram conceptually illustrating an example of a hardware-based implementation of an entropy expander, in accordance with a non-limiting embodiment.

To this end, and as shown in FIG. 5B, each of the switching elements 53 $p_0, \ldots p_{M-1}$ may include a $2^N$-by-$2^N$ single-input, single-output blocking switch fabric 57, whose switching behavior is driven by a switch map 58. The switch map 58 is unique for each of the switching elements 53 $p_0, \ldots p_{M-1}$. In addition, each of the switching elements 53 $p_0, \ldots p_{M-1}$ includes an expander 59 positioned upstream of the corresponding switch fabric 57 and a compressor 60 positioned downstream of the corresponding switch fabric 57. The expander 59 is configured to convert the N-bit input data word 33 into a $2^N$-element sparse input bit array. The switch fabric 57 produces, based on the corresponding switch map 58, a $2^N$-element sparse output bit array from the $2^N$-element sparse input bit array. The compressor 60 then takes the $2^N$-element sparse output bit array output by the switch fabric 57 and produces an N-bit output data word 35 therefrom.

The switching behavior of each of the M switching elements 53 $p_0, \ldots p_{M-1}$ is unique relative to the others. Due to the number of possible combinations of sparse input arrays and sparse output arrays, the total possible number of unique switching elements 53 is $(2^N)!$, which can be quite large, even for small values of N. In the present implementation, the switching core 51 includes a subset of M switching elements 53, where M can be any desired number.

In the embodiment of FIG. 5B, each of the switching elements 53 includes both an expander 59 and a compressor 60, and the dispatcher 50 acts as a demultiplexer to route the N-bit input data word 33 to the expander 59 of the selected switching element $p_k$. However, in alternative implementations or embodiments, rather than include an expander 59 and a compressor 60 for each switching element 53, the dispatcher may include a single expander combined with a demultiplexer driven by the value k so that the $2^N$-element sparse input word produced by the single expander is sent to the $k^{th}$ switch fabric. Similarly, in this alternative embodiment, the collector may include a single compressor with a multiplexer, and may be connected to the outputs of all switch fabrics and provided with a select value (i.e., k) so that the correct $2^N$-element sparse output word is selected by the collector and converted into the N-bit output data word.

Figure 6:
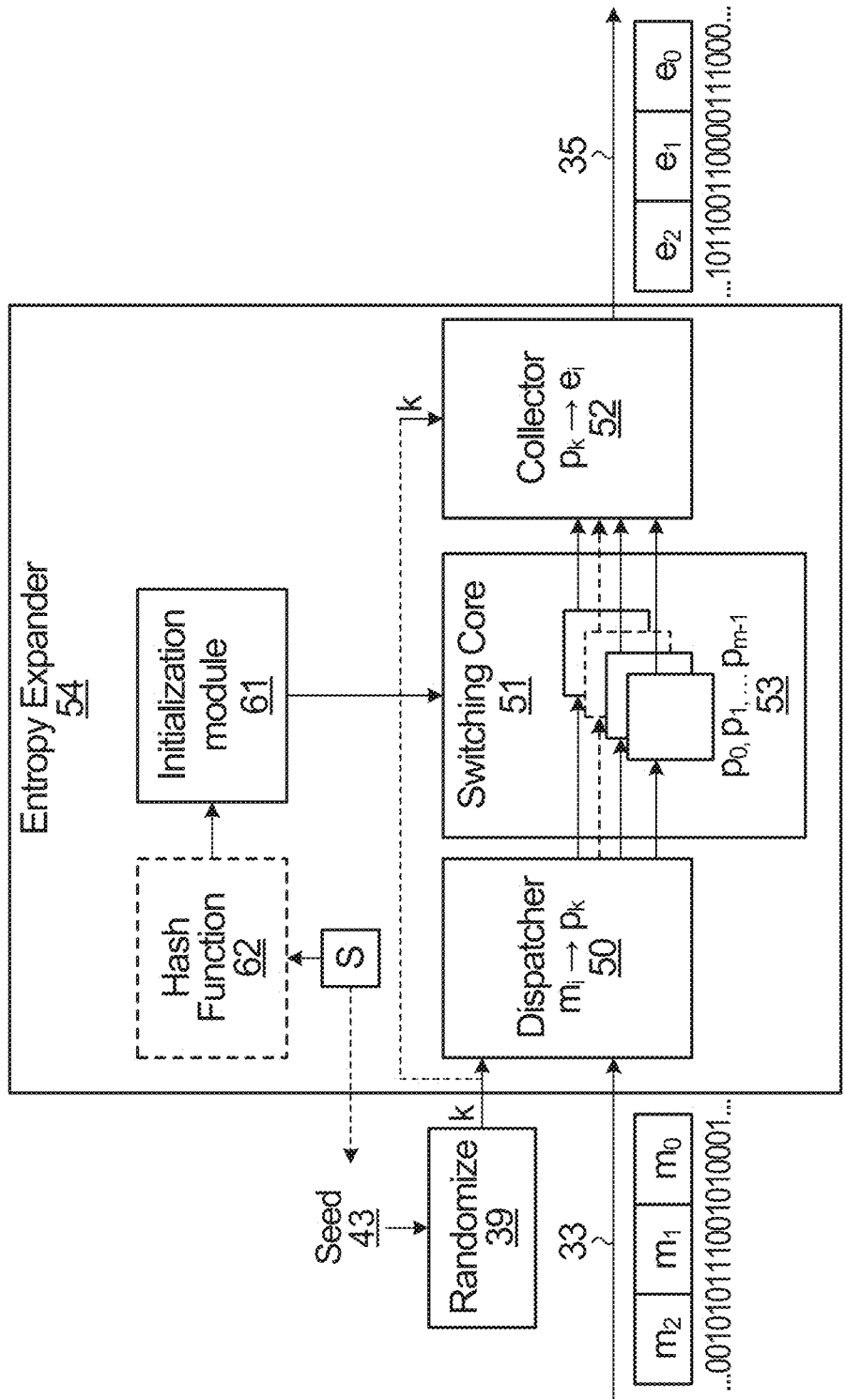
FIG. 6 is a block diagram conceptually illustrating an implementation whereby a secret is fed to an initialization module, in accordance with a non-limiting embodiment.

The switching elements 53 $p_0, \ldots p_{M-1}$ may be initialized in any suitable way. In one embodiment, the secret S is used to initialize the switch maps 58 of the switching elements 53 $p_0, \ldots p_{M-1}$. Reference is made to FIG. 6, which shows an implementation whereby the secret S is fed to an initialization module 61 (either directly or via a hash function 62). The initialization module 61 is configured to generate, in a deterministic manner, the various unique switch maps 58 used by the switching elements 53, based on the secret S.

For an N-bit switching core with a single permutation element, the length of the pre-shared secret S can be up to $\log_2(2^N!)$ random bits. Where there are M switching elements 53 $p_0, \ldots p_{M-1}$, the length of the pre-shared secret can be up to $M*\log_2(2^N!)$ random bits. One example of an initialization process comprises applying a shuffling algorithm to a state table T[i][j] (i=0, 1, 2, ..., M−1; j=0, 1, 2, ..., $2^N-1$) 67, with the secret S. Each individual switching element $p_i$ can therefore be represented as a "permutation matrix" $p_i[x,y]$ with $p_i[x,y]=0$ except for $p_i[x, T[i][x]]=1$, obtained from the portion T[i][*] of the state table T[i][j]. In essence, the state table T[i][j] is a decimal value of the position of the non-zero column in the $j^{th}$ row of permutation matrix $p_i$. The shuffling algorithm can be any well-known algorithm such as Fisher Yates or RC4 key scheduling algorithm. For each raw shuffling, it takes up to $N*2^N$ bits from the shared secret S.

Figure 7:
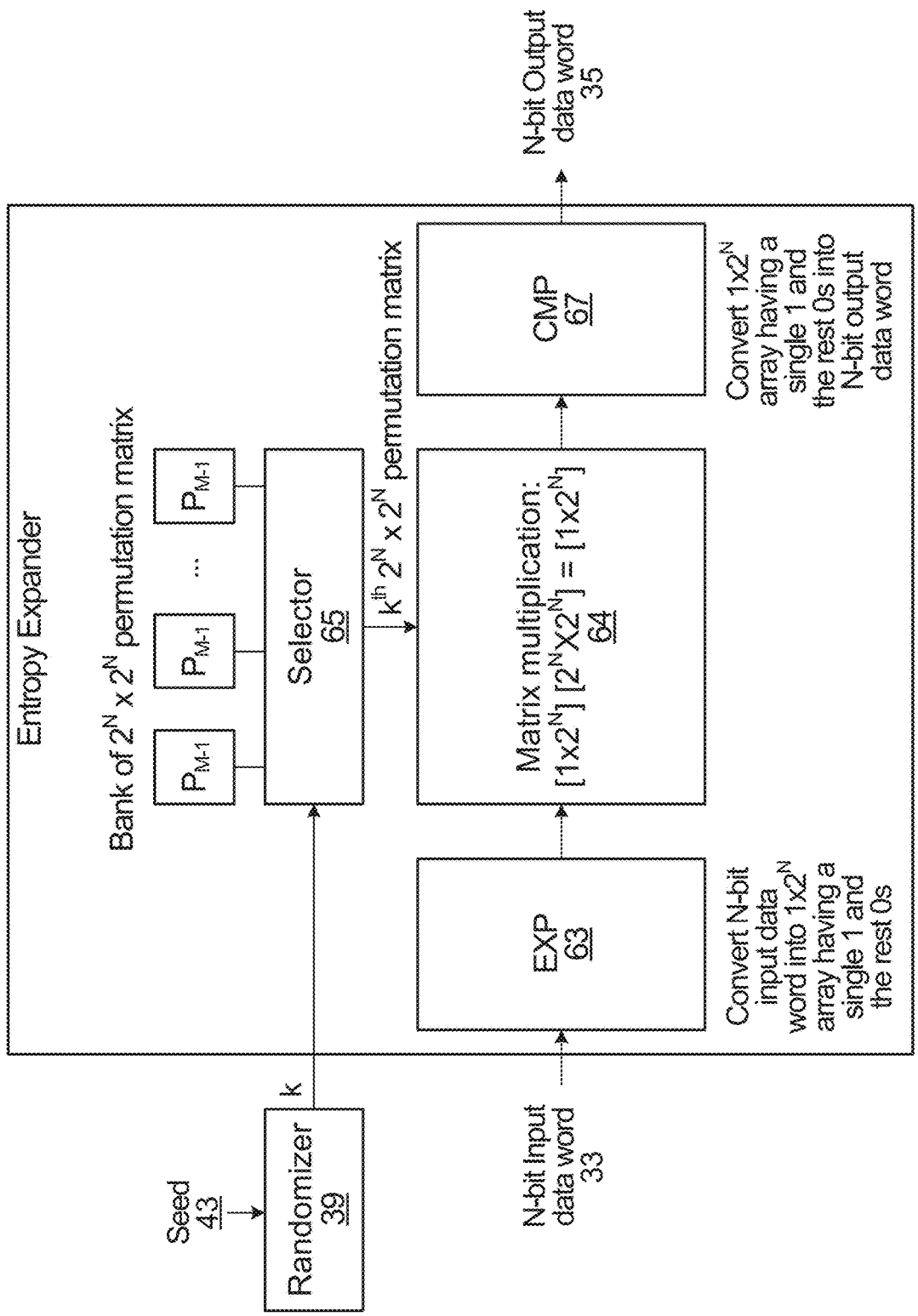
FIG. 7 is a block diagram conceptually illustrating a software expander used to convert an input data word into a sparse input array, in accordance with a non-limiting embodiment.

In some embodiments of the entropy expander 37, certain functionalities of the dispatcher, switching core and collector are implemented in software. For example, as shown in FIG. 7, a software entropy expander 63 may be used to convert the N-bit input data word 33 into the $2^N$-element sparse input array. A software switching core 64 performs matrix multiplication by multiplying an input column vector (the $2^N$-element sparse input array) with the kth of M permutation matrices $p_0, \ldots p_{M-1}$ (obtained via a software selector 65) to produce an output column vector (the $2^N$-element sparse output array). A software compressor 67 may be used to convert the $2^N$-element sparse output array into the N-bit output data word 35. In this case, the M permutation matrices $p_0, \ldots p_{M-1}$ can comprise the aforementioned "permutation elements", only one of which is selected and used for matrix multiplication by the software entropy expander 63.

The effect of the software switching core 64 in executing the above process can be viewed as involving multiplication of a sparse input array (or vector) and a permutation matrix, in order to output a new vector, which is then converted to an N-bit output word. The process can be optimized in software and expressed as follows. Given the M permutation matrices $p_i$ (i=0 ... M−1) of the software switching core 64, and given that each permutation matrix $p_i$ has $2^N$ inputs and outputs (indexed as 0 ... $2^N-1$), this can be collapsed into a single matrix having a total of $M*2^N$ inputs and $M*2^N$ outputs. This is referred to as the state table for encoding, denoted T (or T[i][j]), which is a (2-dimensional) matrix representing the entire software switching core 64 with i=0, 1, 2, ..., M−1 and j=0, 1, 2, ..., $2^N-1$. For each permutation matrix $p_i$, one has $p_i[j,k]=0$ for all j and k, except for those k=T[i][j], where $p_i[j,T[i][j]]=1$. So if i is the dispatch index and j is the decimal value of the N-bit word, then the output N-bit word k=T[i][j]. The output word is directly a one-step assignment from the state table.

It is also worth noting that the state table for decoding, denoted T*, can be similarly constructed from the same permutation matrices $p_0, \ldots p_{M-1}$ as are used to construct T, the state table for encoding. Specifically, for each permutation matrix $p_i$, one has $p^T_i[j,k]=0$ for all j and k, except for those k=T*[i][j], where $p^T_i[j,T*[i][j]]=1$. So if i is the dispatch index and j is the decimal value of the input N-bit word, then the output N-bit word k=T*[i][j]. As such, encoding and decoding efficiency is the same, as opposed to a lookup table used for encoding, which requires significantly more effort on the decoding side.

There are other implementations to achieve the output N-bit word T*[i][j] where i is the dispatch index and j is the decimal value of the input N-bit word, including arrays and linked lists, but it may be concluded that the array T*[i][j] is computationally most efficient, where it is recalled that for each permutation matrix $p_i$, one has $p_i[j,k]=0$ for all j and k, except for those k=T[i][j], where $p_i[j,T[i][j]]=1$. The unique transpose relationship between T and T* makes decoding of the same computational complexity as encoding.

Communication System

Figure 8:
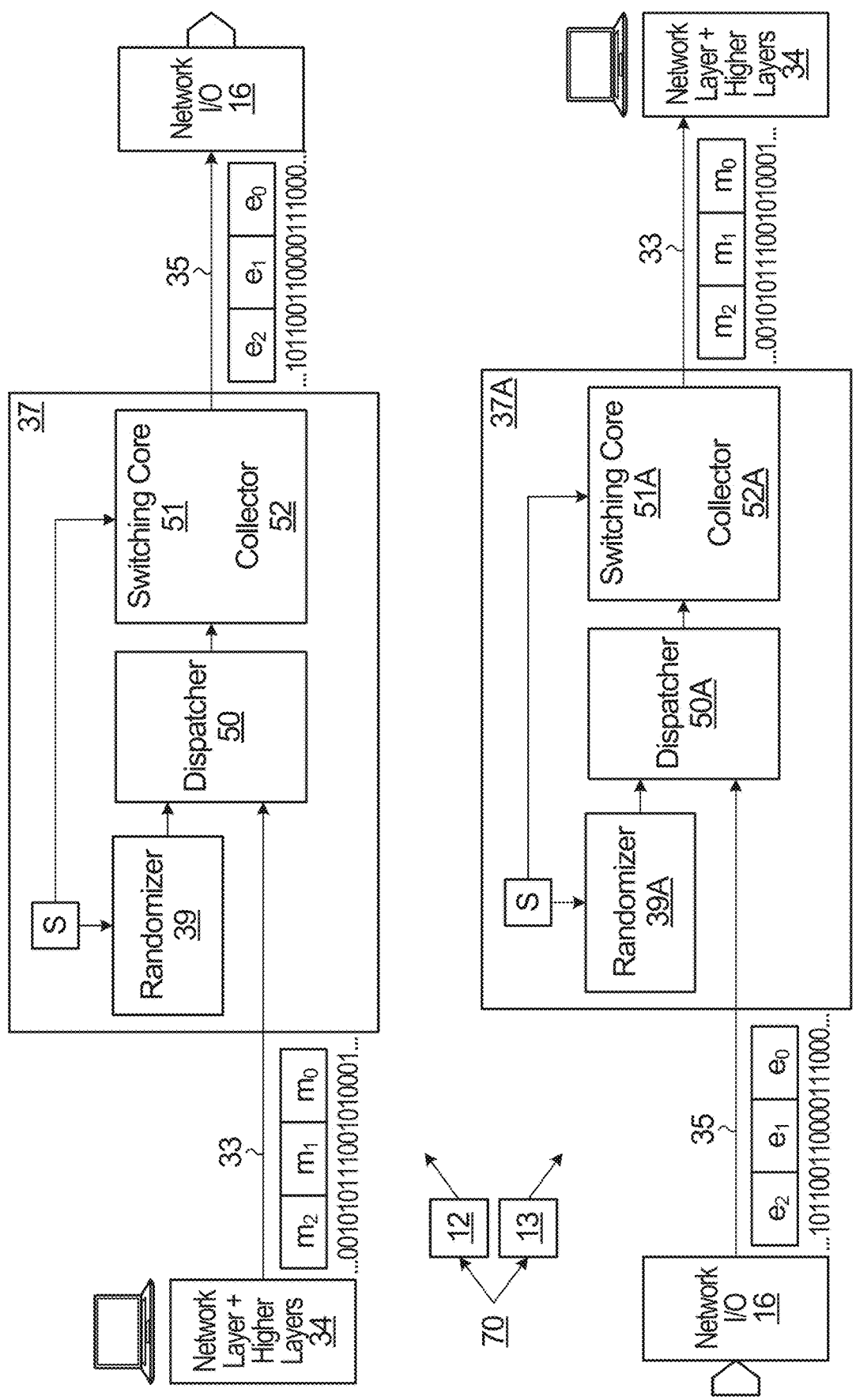
FIG. 8 is a block diagram conceptually illustrating a commercial application in the context of a device-to-device communication system, in accordance with a non-limiting embodiment.
Figure 9:
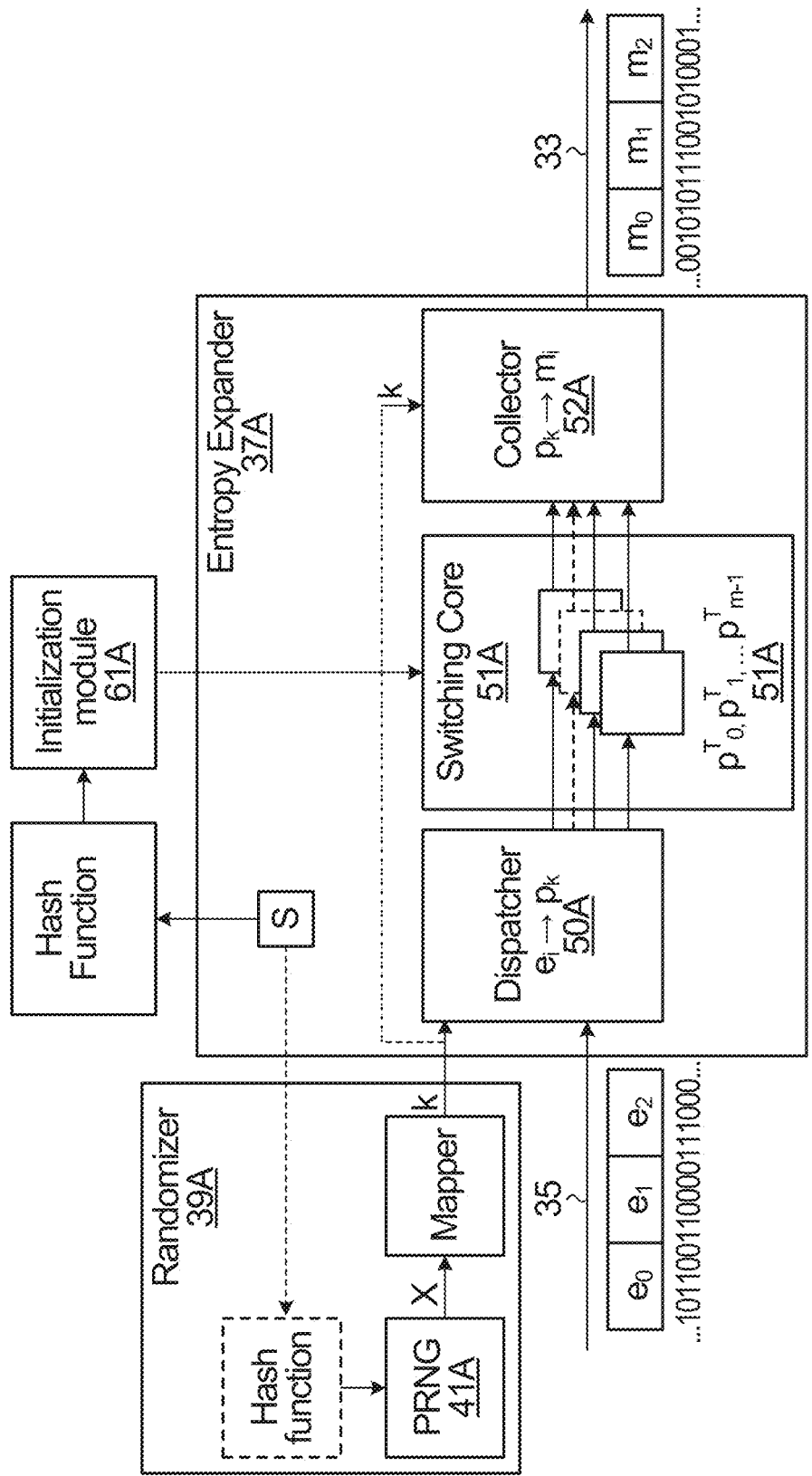
FIG. 9 is a block diagram conceptually illustrating a block diagram of the components of the entropy expander at the recipient device in the communication system of FIG. 5A.

FIG. 8 shows a commercial application of the present technology, in the context of a device-to-device communication system 70. In this embodiment, the sender device 12 and the recipient device 13 are both computing devices; for example, either or both may be a laptop computer, web server, mobile phone, etc. FIG. 5A is a block diagram showing the components of the entropy expander 37, at the sender device 12 in the communication system 70 of FIG. 8. For completeness, FIG. 9 is a block diagram showing the components of the entropy expander 37A, but at the recipient device 13 in the communication system 70 of FIG. 8. Specifically, the entropy expander 37A at the recipient device 13 includes a dispatcher 50A, a switching core 51A and a collector 52A. FIG. 9 illustrates a hardware-based implementation of the permutation elements but it should be understood that other implementations are possible, including a software-based implementation.

Also provided as part of the recipient device 13 is a randomizer 39A, which produces a randomized value k between 0 and M−1. In some embodiments, a secret S (which is shared with the sender device 12, together with shared session information such as session ID during a typical communication session), is used by the randomizer 39A to produce a randomized value k between 0 and M−1, where M>1. The randomizer 39A may include a PRNG 41 (with or without a mapper, as has been previously described in the context of the sender device 12). In some embodiments, the value of k is produced in a deterministic fashion and the randomizer 39A is not required.

The entropy expander 37A at the recipient device 13 is in this case configured to convert an N-bit input data word received from the sender device 12 (namely, $e_0, e_1, \ldots$) into a $2^N$-element sparse input array and to process the $2^N$-element sparse input array with a selected one of M switching elements 53A, denoted $p^T_0, \ldots p^T_{M-1}$, to produce an $2^N$-element sparse output array. It is noted that the operation of switching element $p_k$ and $p^T_k$, if represented as permutation matrices, for a given value of k, would be transposes of one another. The switching core 51A is further configured to convert the N-bit sparse output array into an N-bit output data word $m_0, m_1, \ldots$, i.e., these are the original N-bit input data words fed to the entropy expander 37 of the sender device 12. The selected one of M switching elements 53A is $p^T_k$, wherein it will be recalled that k is computed by the randomizer 39A or in some deterministic fashion as it was at the sender device 12. As such, the collector 52A ensures that it reads/identifies the N-bit output data word from the selected, correct (i.e., $k^{th}$) permutation element in the switching core 51A.

It is therefore noted that both the sender device 12 and the recipient device 13 can utilize a virtually identical entropy expander 37, 37A (with the only difference being that the permutation matrices that define the permutation elements being transposes of one another). Functionally, the output data words from the perspective of the sender device's 12 entropy expander 37 are the input data words from the perspective of the recipient device's 12 entropy expander 37A. As such, as long as there is coordination among the indexes, i.e., such that output data words e0, e1, . . . encrypted using kth permutation element at the sender device 12 are decrypted using the kth permutation element at the recipient device 13, the resulting data words m0, m1, . . . produced at the output of the recipient device's entropy expander 37A will be identical to the input data words m0, m1, . . . received at the input of the sender device's entropy expander 37.

In other words, just like the sender device 12 obtains a value k between 0 and M−1, inclusively, the recipient device 13 obtains a value j between 0 and M−1, inclusively. Each of the N-bit data words received from the sender device 12 is processed based on the $j^{th}$ of M recipient permutation elements of the entropy expander 37A to produce corresponding N-bit data words. The values of j and k are synchronized/coordinated so that the value of k used by the sender device's entropy expander 37 to produce a particular N-bit data word that is processed by the recipient device's entropy expander 37A is the same as the value of j used by the recipient's entropy expander 37A when processing that particular N-bit data word. Moreover, when representing corresponding ones of the permutation elements in the sender device 12 and the recipient device 13 by permutation matrices, these need to be transposes of one another (i.e., $p_k$ and $p^T_k$). In other words, k and j are the same when a particular N-bit data word is processed by (exits) by the kth permutation element of the sender device and is processed by (e.g., enters) the jth permutation element of the recipient device, the kth and jth permutation elements being characterized by permutation matrices that are transposes of one another.

Figure 10:
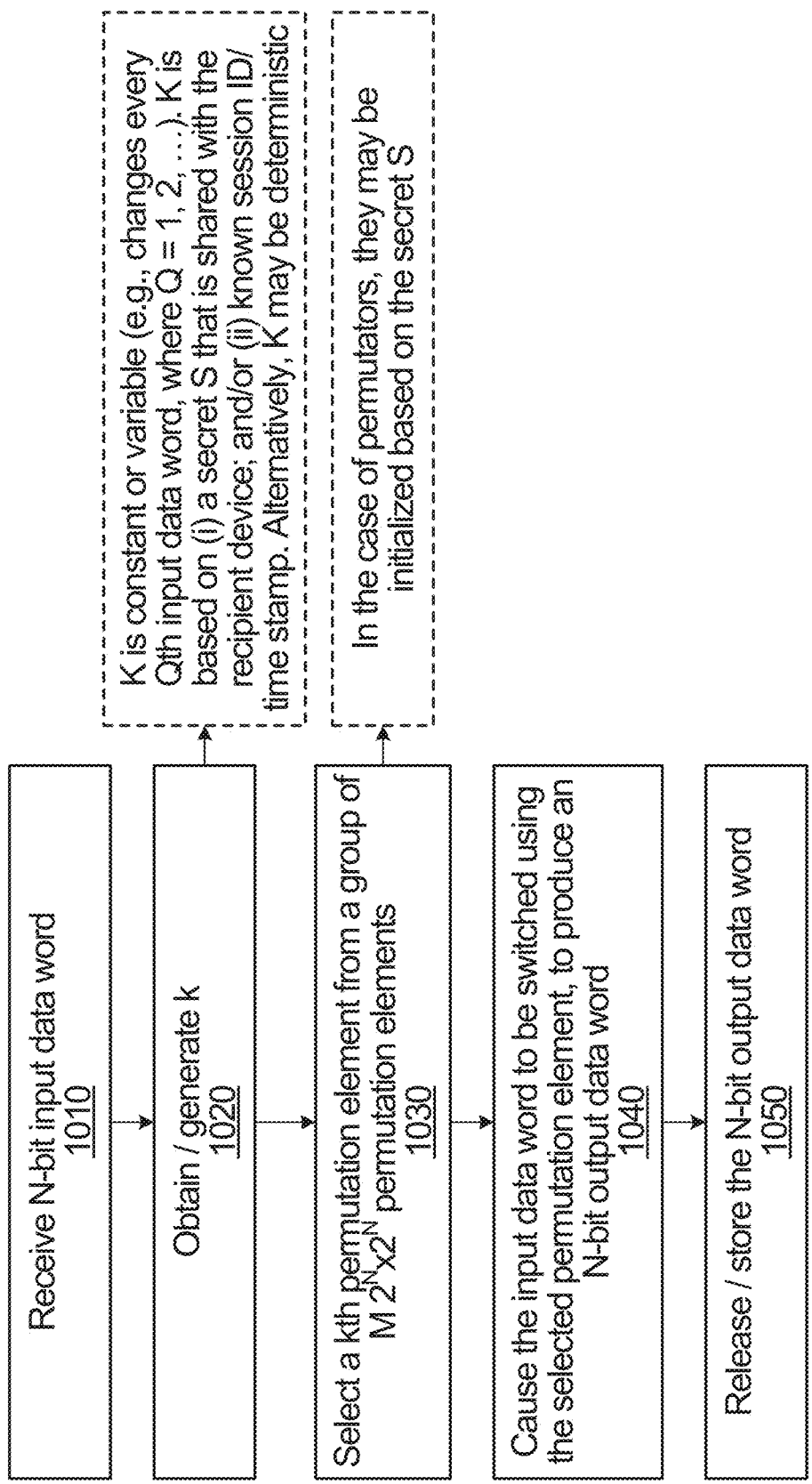
FIG. 10 is a flowchart showing steps in the operation of an entropy expansion process as carried out by an entropy expander, in accordance with a non-limiting embodiment.

Certain steps in the operation of the entropy expansion process as carried out by the entropy expander 37, 37A are now described with reference to the flowchart in FIG. 10, i.e., this entropy expander can be the one implemented by the sender device 12 or the recipient device 13. At step 1010, an N-bit input data word is received. At step 1020, a value of k is generated, e.g., based on the secret S. Alternatively or in addition, the value of k may be based on a known session ID or a time stamp. Alternatively or in addition, k can be deterministic (e.g., cycle through an order). It is noted that k identifies a permutation element to be selected and k may be constant throughout the entropy expansion process or it may be variable (e.g., changes every $Q^{th}$ input data word, where Q=1, 2, . . . ), in which case this value of Q should be known to both the sender device 12 and the recipient device 13).

At step 1030, the $k^{th}$ permutation element is selected from a set of M permutation elements. In the case of hardware-based permutation elements, this may result in selecting the $k^{th}$ switching element from a bank of switch fabrics; in the case of software-based permutation elements, this may result in calling a matrix multiplication using the $k^{th}$ of M permutation matrices. In either case, with reference to step 1040, the result is an N-bit output data word. In some embodiments, the N-bit output data word is obtained through the intermediate steps of converting the N-bit input data word into a $2^N$-element sparse input array, transforming it into a $2^N$-element sparse output array by hardware switching, and converting the result into the N-bit output data word. Other implementations use software matrix multiplication or optimized array access.

At step 1050, the N-bit output data word is either released onto the data network (e.g., in the case of the entropy expander 37 implemented by the sender device 12) or used by higher-layer network, protocols, layers or applications (e.g., in the case of the entropy expander 37A implemented by the recipient device 13).

AES

In another commercial application of the present technology, the sender device 12 and the recipient device 13 are both computing devices that implement Advanced Encryption Standard (hereafter AES) technology.

Figure 11:
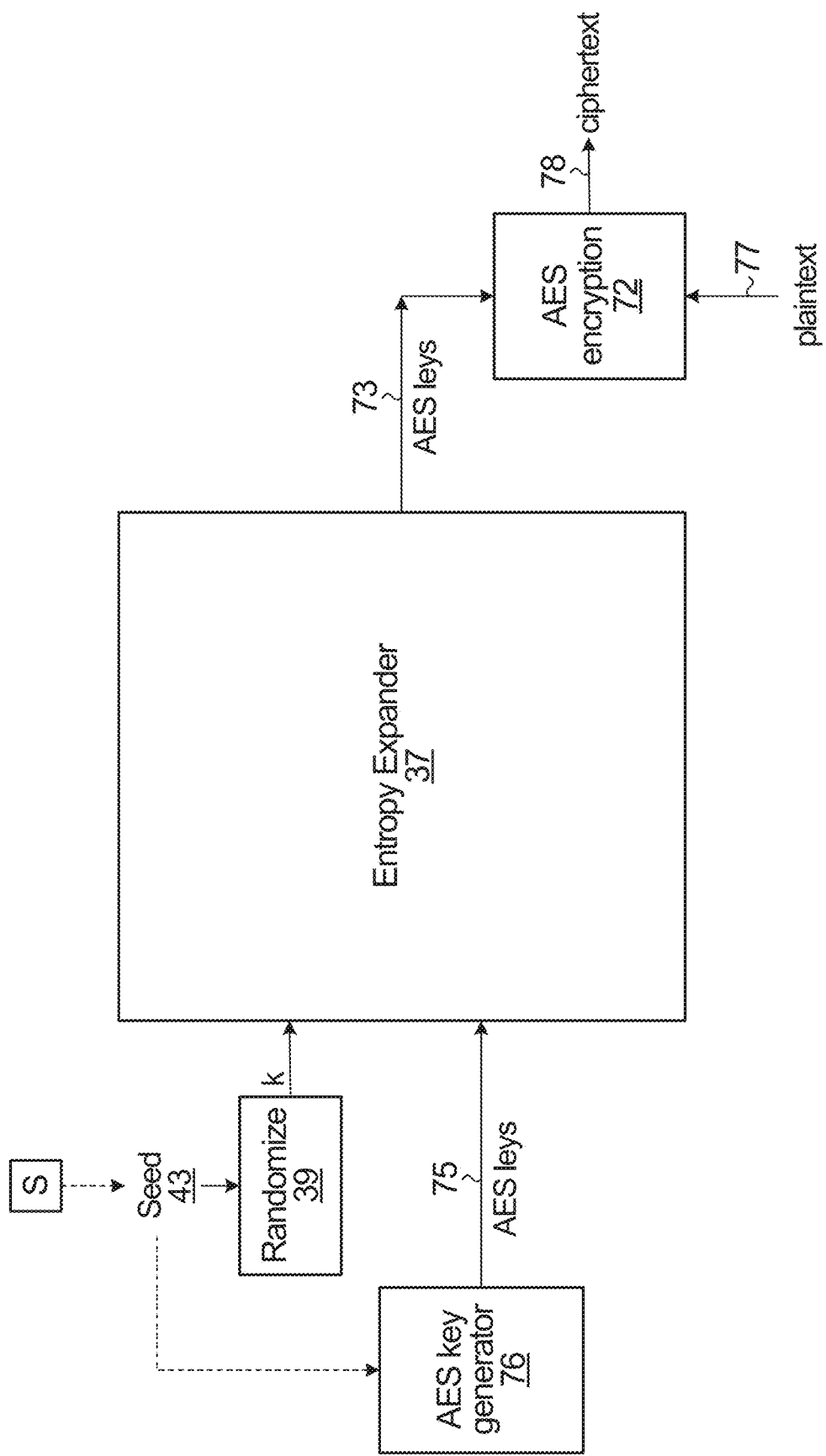
FIG. 11 is a block diagram showing a system used to expand the entropy of AES round keys, in accordance with a non-limiting embodiment.

To this end, FIG. 11 shows an AES encryption block 72 at the sender device 12. The AES encryption block 72 is used to encrypt plaintext 77 (such as data that the sender device 12 wishes to transmit) into ciphertext 78 using a set of AES keys (e.g., AES round keys). In an embodiment, the AES encryption block 72 is a known block and can operate as per the specification published by the International Organization for Standardization as "ISO/IEC 18033-3:2010—Information technology—Security techniques—Encryption algorithms—Part 3: Block ciphers", hereby incorporated by reference herein. As such, the AES encryption block 72 uses AES keys, except that these AES keys are not conventional AES keys 75 provided by an AES key generator 76, but rather modified AES keys 73 provided by an entropy expander 37. Specifically, the entropy expander 37 receives the conventional AES keys 75 (e.g., conventional AES round keys) from a conventional AES key generator 76 and increases their entropy to produce the modified AES keys 73 (e.g., modified AES round keys).

The manner in which the entropy expander 37 generates the modified AES keys 73 from the conventional AES keys 75 is now described. More specifically, the entropy expander 37 takes the conventional AES keys 75 (e.g., AES round keys) as its N-bit input data words. The entropy expander 37 operates the same way as has been previously described above, producing N-bit output data words based on selecting the $k^{th}$ permutation element in a set of M permutation elements (e.g., switch fabrics or permutation matrices). The N-bit output data words are thus the modified AES keys 73 (e.g., modified AES round keys) provided to the AES encryption block 72.

In some embodiments, k is derived from a secret S (e.g., as the output of a randomizer 39 that consumes the secret S and produces an output k, as has been previously described above); in that case, the secret S is shared with the recipient device 13 so that it may generate the same value of k. In other embodiments, k is also based on a time stamp or session ID. In still other embodiments, k is cycled through (e.g., 0 to M−1) in a deterministic manner that will be known to the recipient device 13.

In some embodiments, the secret S that is used to generate k is also used to initialize the AES key generator 76.

A complementary architecture is implemented at the recipient device 13, i.e., a corresponding AES encryption block receives the ciphertext 78 (from the sender device 12) and decrypts it into the original plaintext 77 using modified AES keys (e.g., modified AES round keys) received from an entropy expander that is identical to the entropy expander 37 at the sender device 12. The same AES key generator 76 is provided, and therefore both the sender device 12 and the recipient device 13 know the output of the AES key generator 76. Also, the outputs of the AES key generator 76 at the recipient device 13 are used as input data feeding the entropy expander at the recipient device 13. In addition, the recipient device 13 implements the same way of generating k as is used at the sender device 12 (i.e., based on the same secret S, possibly together with the same time stamp and/or session ID, or the same deterministic manner of cycling through). As such, the entropy expander at the recipient device 13 generates the exact same modified AES keys as the modified AES keys 73 that were generated by the sender device 12. These same modified AES keys are then used by the AES encryption block to effect decryption, as AES is a symmetric encryption technology.

Three variants of AES are based on different key sizes (128, 192, and 256 bits). For simplicity, focus may initially be had on the 128-bit version of the AES key schedule, which provides sufficient background to understand the 192- and 256-bit variants as well. The encryption phase of AES can be broken into three phases: the initial round, the main rounds, and the final round. All of the phases use the same sub-operations in different combinations as follows:

Initial Round
AddRoundKey
Main Rounds
SubBytes
ShiftRows
MixColumns
AddRoundKey
Final Round
SubBytes
ShiftRows
AddRoundKey The main rounds of AES are repeated a set number of times for each variant of AES. AES-128 uses 9 iterations of the main round, AES-192 uses 11, and AES-256 uses 13.

As mentioned above, the four sub-operations of AES are AddRoundKey, SubBytes, ShiftRows, and MixColumns.

AddRoundKey:

The AddRoundKey operation is the only phase of AES encryption that directly operates on the AES round key. In this operation, the input to the round is exclusive-ored with the round key.

SubBytes:

The SubBytes phase of AES involves splitting the input into bytes and passing each through a Substitution Box or S-Box. The AES S-Box implements inverse multiplication in Galois Field 28.

ShiftRows

In the ShiftRows phase of AES, each row of the 128-bit internal state of the cipher is shifted. The rows in this stage refer to the standard representation of the internal state in AES, which is a 4×4 matrix where each cell contains a byte. Bytes of the internal state are placed in the matrix across rows from left to right and down columns.

In the ShiftRows operation, each of these rows is shifted to the left by a set amount: their row number starting with zero. The top row is not shifted at all, the next row is shifted by one and so on.

MixColumns

Like the ShiftRows phase of AES, the MixColumns phase provides diffusion by mixing the input around. Unlike ShiftRows, MixColumns performs operations splitting the matrix by columns instead of rows. Unlike standard matrix multiplication, MixColumns performs matrix multiplication as per Galois Field $2^8$. This multiplication has the property of operating independently over each of the columns of the initial matrix, i.e. the first column when multiplied by the matrix, produces the first column of the resultant matrix.

The AES Key Schedule is used to produce a set number of round keys from the initial key. In AES, the initial key is used in the initial round of AES as input to the AddRound-Key operation. From this key, 10, 12, or 14 round keys are produced as input to the other AddRoundKey operations in the 128, 192, and 256-bit versions of AES. Each word (32 bytes) of the previous round key is exclusive-ored with some value to produce the corresponding word of the current round key. In the case of words 1-3, the value used in the exclusive-or is the previous word (words 0-2) of the previous round key. For the first word of the round key, the value used in the exclusive-or is the result of passing the last word of the previous round key through the g function.

The g function consists of three stages: an S-Box transformation, a permutation, and an exclusive-or. The S-Box operation used in the AES key schedule is identical to the one used in the encryption phase as described previously. In the permutation phase of the g function, each byte of the word is shifted one position to the left. Finally, the leftmost byte is exclusive-ored with a round constant. The rounds constants in AES are the value of 2round_number modulo Galois Field $2^8$.

The output of the key schedule function is used as the round key input to the AddRoundKey operation in AES encryption. An identical transformation on the round key is performed to produce the next round key.

Decryption in AES

To decrypt an AES-encrypted ciphertext, it is necessary to undo each stage of the encryption operation in the reverse order in which they were applied. The three stage of decryption are:

Inverse Final Round
AddRoundKey
ShiftRows
SubBytes
Inverse Main Round
AddRoundKey
MixColumns
ShiftRows
SubBytes
Inverse Initial Round
AddRoundKey Of the four operations in AES encryption, only the AddRoundKey operation is its own inverse (since it is an exclusive-or). To undo AddRoundKey, it is only necessary to expand the entire AES key schedule (identically to encryption) and then use the appropriate key in the exclusive-or.

The other three operations require an inverse operation to be defined and used. The first operation to be undone is ShiftRows. The Inverse ShiftRows operation is identical to the ShiftRows operation except that rotations are made to the right instead of to the left.

The next operation to be undone is the SubBytes operation. An inverse S-Box is used.

The last inverse operation to define is MixColumns. Like MixColumns, Inverse MixColumns can be defined as the matrix multiplication in Galois Field $2^8$. The specific values in both matrices are chosen in a way such that one multiplication is the inverse of the other in Galois Field $2^8$.

AES ciphertexts are decrypted by following the order of operations explained above, using the appropriate inverse operations and using round keys in reverse order.

There are two variants of AES based on different key sizes (192 and 256 bits) in addition to the 128-bit version of the AES key schedule described above. All three variants of AES use a 128-bit block size, only the key sizes differ. The overall structure of the encryption stage of AES is identical for all three variants, but the number of rounds varies for the 128, 192, and 256-bit variants (10, 12, and 14 rounds respectively). The key schedule is different for each variant.

More details can be found in, for example, Avi Kak, Lecture 8: AES: The Advanced Encryption Standard, Lecture Notes on "Computer and Network Security", Feb. 5, 2020, available at https://engineering.purdue.edu/kak/compsec/NewLectures/Lecture8.pdf, hereby incorporated by reference herein.

Those skilled in the art will therefore appreciate that in some embodiments, the AES algorithm takes in blocks of bits (e.g., 128, 256, . . . ) and applies a sequence of substitutions and permutations. The substitutions employ an "S-box", an invertible nonlinear transformation that works on 8 bits at a time, i.e., if carries out byte substitution.

There are 256 possible 8-bit numbers, and so the S-box can be represented as a 256 by 256 permutation matrix with certain constraints on the mapping based on invertibility in GF $2^8$. This makes the S-box amenable to entropy enhancement as suggested by the present disclosure.

Figure 13:
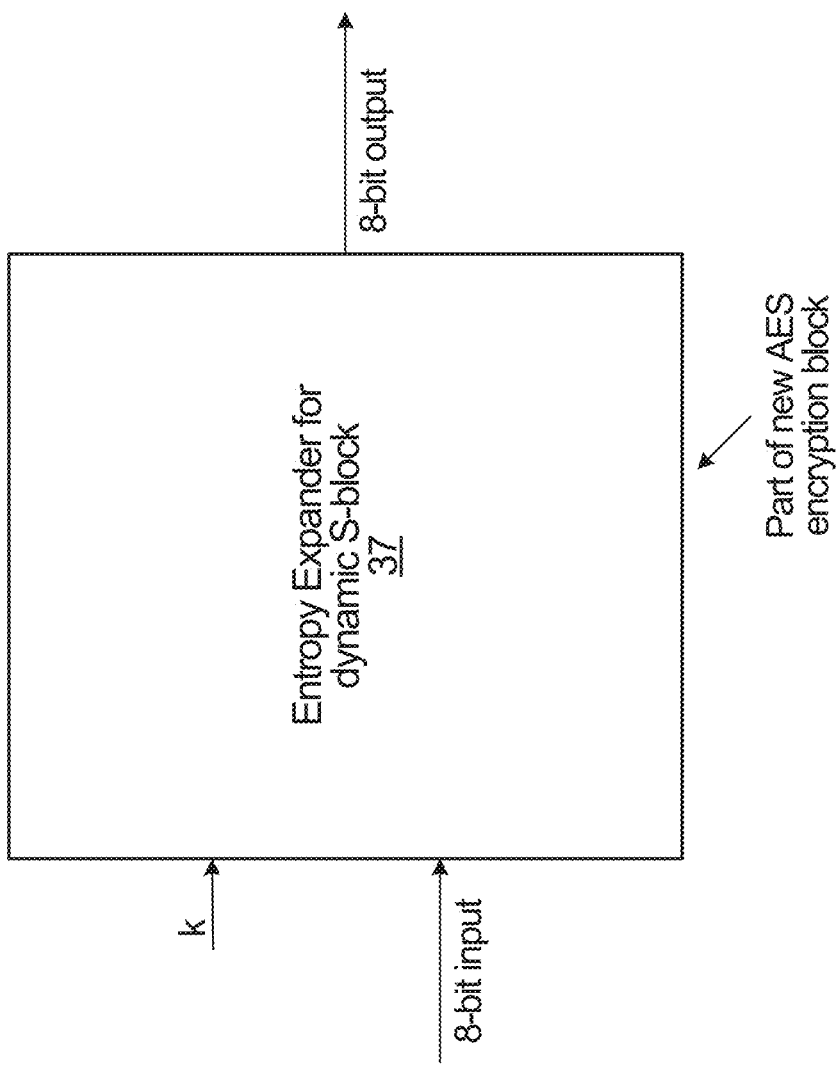
FIG. 13 is a block diagram illustrating use of an entropy expander as a dynamic S-block in the AES encryption algorithm.

Specifically, the S-box may be rendered dynamic (see FIG. 13) using the same techniques as described above for selecting a permutation element. In particular, the conventional AES algorithm, instead of using a fixed S-box to produce an 8-bit output word based on a given 8-bit input word, takes the given 8-bit input word and feeds it to an entropy enhancer, thereby to produce an entropy-enhanced 8-bit output word. The entropy enhancer dynamically selects the $k^{th}$ of M permutation elements (each corresponding to a 256×256 permutation matrix) and performs switching or matrix multiplication etc. as has previously been described above. There are 256! possible such permutation elements, however only M are utilized. It is possible to initialize these M permutation elements based on the secret S and/or the seed that would normally have been used to initialize the AES encryption block 72, except that now it is no longer a conventional AES encryption block. Initialization of the permutation elements was discussed earlier regarding the initialization module 61 in FIGS. 6 and 9. It is noted that the condition of the permutation operation carrying out inverse multiplication in GF($2^8$) may apply, which may limit the number of feasible S-boxes to choose from.

This results in a dynamic S-box, which is selected from the complete set of permutation elements. In some embodiments the selection is randomized, i.e., there is a non-deterministic or stochastic aspect to the way in which the $k^{th}$ permutation element is selected, which may be the output of a randomizer, etc. It should be appreciated that the same S-box may be used for each block of input words; for example, if a block is sixteen consecutive 8-bit input words, k may remain constant for sixteen consecutive 8-bit input words. The next set of 8-bit input words uses another S-box selected with the next value of k, and so on.

As such, in the context of AES, entropy expansion as disclosed herein can be used to increase entropy of the AES keys (e.g., AES round keys) and/or to increase entropy of the S-box used by otherwise conventional AES encryption. Of course, two entropy expanders may be used, one for each purpose. The first may be tailored to the size of the AES round keys (e.g., 10 bits, 12 bits, 14 bits) and the second may be tailored to the size of the S-box (e.g., 8 bits), and may change the permutation element every, say, 16 bytes. The first and second entropy expanders thus have its own values of M (e.g., M1 and M2) and their own values of k (e.g., k1 and k2).

Random Number Generation

In another commercial application of the present technology, the objective is to generate an output stream of pseudo-random numbers that is more random (i.e., has higher entropy) than an input stream of pseudo-random numbers. In this case as well, there is no need for a secret S to be shared with a recipient, and there is no need for coordination between sender device 12 and recipient device 13.

Figure 12A:
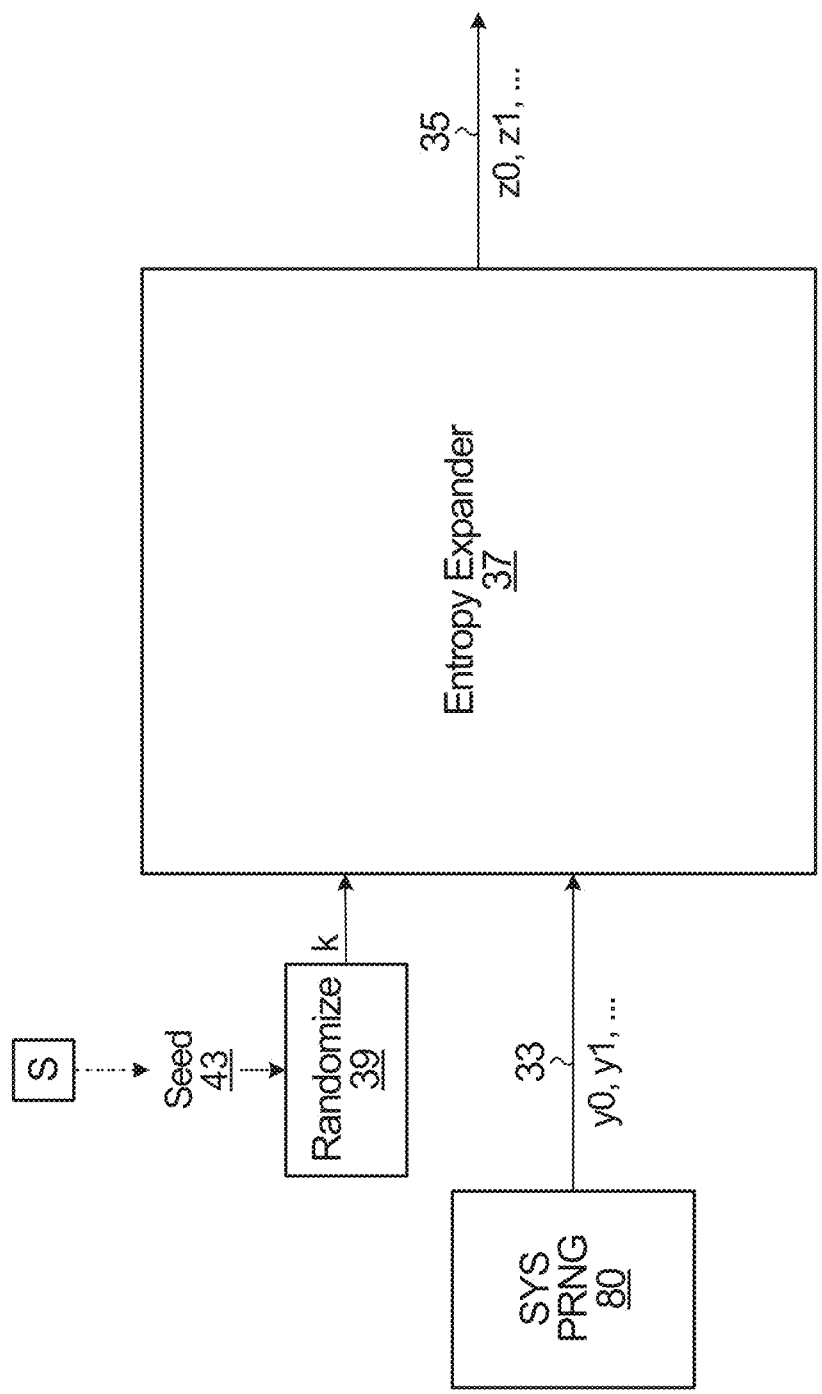
FIG. 12A is a block diagram showing an entropy expander used to enhance entropy of a system PRNG that supplies an input stream of pseudo-random numbers, in which a dispatcher of the entropy expander is fed by the output of a randomizer, according to a non-limiting embodiment.

Accordingly, reference is made to FIG. 12A, which shows an entropy expander 37 used to enhance entropy of a system PRNG 80 that supplies a stream of N-bit pseudo-random numbers y0, y1, . . . , resulting in a stream of N-bit pseudo-random numbers z0, z1, . . . . Details of the system show a randomizer 39 that produces a randomized value k between 0 and M−1, where M>1. The randomizer 39 may include a PRNG 41 and may include a mapper 42, as has already been described. A switching core 51 may be configured to convert an N-bit input data word y0, y1, . . . , into a $2^N$-element sparse input bit array and to process the $2^N$-element sparse input bit array with the $k^{th}$ of M permutation elements to produce an $2^N$-element sparse output bit array. The switching core 51 may be further configured to convert the N-bit sparse output array into an N-bit output data word z0, z1, . . . , which is then output by the collector 52. Of course, a software version of the entropy expander 37 can also be implemented, whereby the entropy expander 37 carries out matrix multiplication of the $2^N$-element sparse input bit array with the $k^{th}$ of M permutation matrices.

Figure 12B:
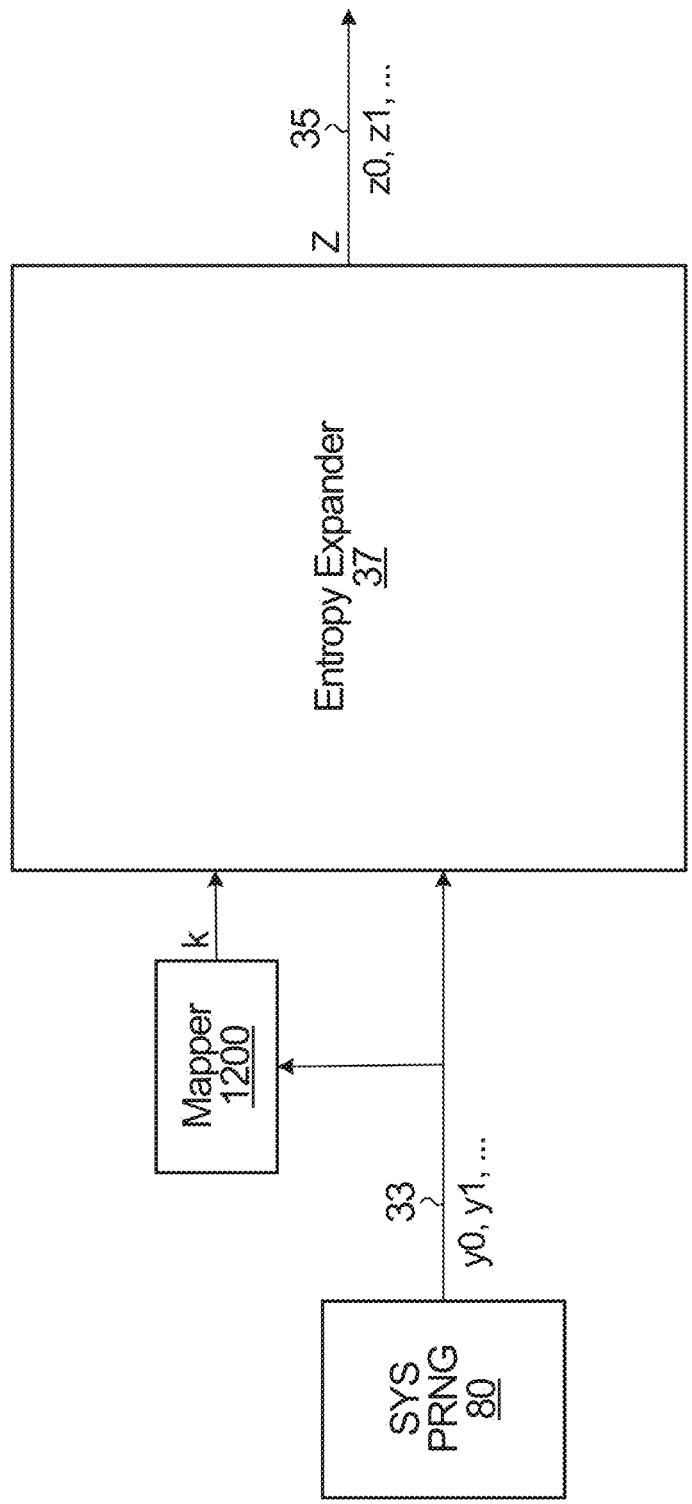
FIG. 12B is a variant of FIG. 12A, in which the dispatcher of the entropy expander is fed by the input stream of pseudo-random numbers itself, according to a non-limiting embodiment.

FIG. 12B is a variant of FIG. 12A, in which the randomized value k is taken from the N-bit input data words 33 rather than from the randomizer 39. Specifically, the N-bit input data words 33 are fed to a mapper 1200 which produces a value k between 0 and M−1, where M>1. The value k is randomized insofar as the N-bit input data words 33 are not deterministic. Still other ways of producing the value k can be used in other embodiments.

Those skilled in the art will appreciate that the term "entropy expander" derives from the expansion of the entropy of an N-bit input data word 33 having a Shannon entropy of N bits. Use of an N-bit switching core 51 ($2^N$ inputs and $2^N$ outputs) has a Shannon entropy of $\log_2(2^N!)$, which is approximately equal to $(N-2)*2^N$ when N is large. This is significantly greater than the N bits of entropy of the N-bit input data word 33. When the switching core consists of M permutation matrices then its Shannon entropy goes to $M*\log_2(2^N!)$, which is approximately equal to $M*(N-2)*2^N$ when N is large.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

In describing the embodiments, specific terminology has been resorted to for the sake of description but this is not intended to be limited to the specific terms so selected, and it is understood that each specific term comprises all equivalents.

Those skilled in the art will appreciate that other modifications may be possible without departing from the scope of the invention as defined in the claims appended hereto.

What is claimed is:

1. A method of operating a computing device connected to a network for cryptographic communication over the network with a recipient device, the method comprising:
   storing a secret S in a non-transitory storage medium, wherein the secret S is shared with the recipient device;
   obtaining a stream of N-bit input data words;
   obtaining a value k between 0 and M−1, inclusively, where M>1, wherein the value k is obtained based at least in part on the secret S;
   processing each of the N-bit input data words at least based on the $k^{th}$ of M permutation elements to produce a corresponding N-bit output data word by (a) converting each of the N-bit input data words into a corresponding sparse $2^N$-element input array, (b) processing the sparse $2^N$-element input array with said $k^{th}$ of M permutation elements to produce a sparse $2^N$-element output array and (c) converting the sparse $2^N$-element output array into the corresponding N-bit output data word; and sending a stream of the N-bit output data words to the recipient device over the network.

2. The digital processing method defined in claim 1, wherein the value of k is randomized.

3. The digital processing method defined in claim 1, wherein obtaining the value of k comprises processing an output of a pseudo-random number generator.

4. The digital processing method defined in claim 1, further comprising obtaining the value of k from the order in which the N-bit input data words appear in the stream of N-bit input data words.

5. The method defined in claim 1, wherein the value k is produced by a pseudo-random number generator whose seed is the secret S or is a hash of the secret S.

6. The method defined in claim 1, wherein the value k is produced by converting an output of a pseudo-random number generator having a value in a range greater than between 0 and M−1 to the value k between 0 and M−1.

7. The method defined in claim 1, wherein each of the M permutation elements comprises a switch fabric configured to carry out a $2^N$-by-$2^N$ blocking switch operation.

8. The method defined in claim 1, wherein each of the permutation elements carries out an operation that is characterizable as a respective $2^N$-by-$2^N$ permutation matrix, and wherein the method further comprises initializing the permutation elements.

9. The method defined in claim 8, wherein initializing the permutation elements comprises selecting, for each of the permutation elements, a different $2^N$-by-$2^N$ permutation matrix.

10. The method defined in claim 9, wherein the secret S is used to randomize the $2^N$-by-$2^N$ permutation matrices for the different permutation elements.

11. The method defined in claim 1, wherein the method comprises sharing the secret S with the recipient device prior to the processing step.

12. The method defined in claim 1, wherein a set of permutation elements is usable by the recipient device to decode the N-bit output data words, the set of permutation elements and corresponding ones of the M permutation elements being characterizable as a permutation matrix and its transpose, respectively.

13. The method defined in claim 1, further comprising receiving the stream of the N-bit input data words from an identified sender that used a set of permutation elements to encode the N-bit input data words, the set of permutation elements of the sender device and corresponding ones of the M permutation elements being characterizable as a permutation matrix and its transpose, respectively.

14. The method defined in claim 1, further comprising changing the value of k such that successive N-bit input data words are processed with different ones of the permutation elements to produce the subsequent corresponding N-bit output data words.

15. The method defined in claim 1, further comprising changing the value of k every Q input data words such that each set of Q N-bit input data words is processed with a first one of the M permutation elements to produce the corresponding N-bit output data words and then a subsequent set of Q N-bit input data words arrays is processed with a second one of the M permutation elements different from the first one of the permutation elements to produce the corresponding N-bit output data words, wherein Q>1.

16. The method defined in claim 1, further comprising changing the value of k for each input data word such that each corresponding $2^N$-element input array is processed with a different one of the permutation elements than the one before.

17. The method defined in claim 1, further comprising changing the value of k for each input data word such that each $2^N$-element output array is obtained from a different one of the permutation elements than the one before.

18. The method defined in claim 1, further comprising periodically changing the secret S.

19. The method defined in claim 1, wherein M is at least as large as 64.

20. The method defined in claim 1, wherein the value k is produced by a first pseudo-random number generator, the method further comprising using a second pseudo-random number generator to produce the N-bit input data words.

21. A digital communications system, comprising:
a sender device connected to a network and configured for:
storing a secret S in a memory of the sender device;
obtaining N-bit first data words;
obtaining a value k between 0 and M−1, inclusively, where M>1, wherein the value k is obtained based at least in part on the secret S;
processing each of the N-bit first data words at least based on the kth of M first permutation elements to produce corresponding N-bit second data words by (a) converting each of the N-bit first data words into a corresponding sparse $2^N$-element input array, (b) processing the sparse $2^N$-element input array with said kth of M permutation elements to produce a sparse $2^N$-element output array and (c) converting the sparse $2^N$-element output array into the corresponding N-bit second data word; and
releasing the N-bit second data words on the network towards a recipient device connected to the network; and
the recipient device configured for:
receiving the N-bit second data words;
obtaining a value j between 0 and M−1, inclusively wherein the secret S was shared by the sender device and wherein the value j is obtained based at least in part on the secret S;
processing each of the N-bit second data words at least based on the $j^{th}$ of M second permutation elements to produce corresponding N-bit third data words by (a) converting each of the N-bit second data words into a corresponding sparse $2^N$-element second input array, (b) processing the sparse $2^N$-element second input array with said kth of M permutation elements to produce a sparse $2^N$-element second output array and (c) converting the sparse $2^N$-element second output array into the corresponding N-bit third data word,
the values of j and k being synchronized so that k and j are the same when a particular N-bit second data word is processed by the $k^{th}$ permutation element of the sender device and the $j^{th}$ permutation element of the recipient device, the $k^{th}$ and $j^{th}$ permutation elements being characterizable as permutation matrices that are transposes of one another; and
outputting the N-bit third data words on the network or storing the N-bit third data words in a memory of the recipient device.

22. A system for cryptographic communication over a network with a recipient device, comprising:
- a memory storing instructions;
- a network I/O for connection to the network; and
- a processor accessing the instructions and, based on the instructions, being configured to:
- store a secret S in the memory, wherein the secret S is shared with the recipient device;
- obtain a stream of N-bit input data words,
- obtain a value k between 0 and M−1, inclusively, where M>1, wherein the value k is obtained based at least in part on the secret S;
- process each of the N-bit input data words at least based on the kth of M permutation elements to produce a corresponding N-bit output data word by (a) converting each of the N-bit input data words into a corresponding sparse $2^N$-element input array, (b) processing the sparse $2^N$-element input array with said kth of M permutation elements to produce a sparse $2^N$-element output array and (c) converting the sparse $2^N$-element output array into the corresponding N-bit output data word; and
- send a stream of the N-bit output data words to the recipient device via the network I/O.

23. A computer-readable medium comprising computer-readable instructions which, when executed by a processor, cause the processor to carry out the digital processing method defined in claim 1.

24. The method defined in claim 1, wherein each of the permutation elements carries out an operation that is characterizable as a respective permutation matrix with $2^N$ rows and $2^N$ columns, and wherein processing each N-bit input data word at least based on the $k^{th}$ of M permutation elements to produce a corresponding N-bit output data word comprises:
- obtaining a row index of the $k^{th}$ permutation matrix from each of the N-bit input data words;
- obtaining the column index of the non-zero element in the row; and
- obtaining the corresponding N-bit output data word from the column index.

25. The system defined in claim 22, wherein to obtain the value of k, the processor is configured to process an output of a pseudo-random number generator.

26. The system defined in claim 22, wherein the value of k is obtained from the order in which the N-bit input data words appear in the stream of N-bit input data words.

27. The system defined in claim 22, wherein each of the M permutation elements comprises a switch fabric configured to carry out a $2^N$-by-$2^N$ blocking switch operation.

28. The system defined in claim 22, wherein each of the permutation elements carries out an operation that is characterizable as a respective $2^N$-by-$2^N$ permutation matrix, and wherein the processor is further configured to initialize the permutation elements.

29. The system defined in claim 28, wherein to initialize the permutation elements, the processor is configured to select, for each of the permutation elements, a different $2^N$-by-$2^N$ permutation matrix, wherein the secret S is used to randomize the $2^N$-by-$2^N$ permutation matrices for the different permutation elements.

30. The system defined in claim 22, wherein the processor is further configured to change the value of k every Q input data words such that each set of Q N-bit input data words is processed with a first one of the M permutation elements to produce the corresponding N-bit output data words and then a subsequent set of Q N-bit input data words arrays is processed with a second one of the M permutation elements different from the first one of the permutation elements to produce the corresponding N-bit output data words, wherein Q>1.

31. The system defined in claim 22, wherein the processor is further configured to change the value of k for each input data word such that each corresponding $2^N$-element input array is processed with a different one of the permutation elements than the one before.

* * * * *